United States Patent [19]

Tamai et al.

[11] Patent Number: 4,973,663

[45] Date of Patent: Nov. 27, 1990

[54] POLY(CYANO ARYLENE SULFIDE/SULFONE)COPOLYMER AND PREPARATION THEREOF

[75] Inventors: Tomoji Tamai; Tetsuya Asahi; Yozo Kondo, all of Mie, Japan

[73] Assignee: Tosoh Corporation, Yamaguchi, Japan

[21] Appl. No.: 337,815

[22] Filed: Apr. 14, 1989

[30] Foreign Application Priority Data

Apr. 15, 1988 [JP] Japan ................................. 63-91595

[51] Int. Cl.$^5$ ............................................ C08G 75/14
[52] U.S. Cl. .................................. 528/362; 528/381; 528/388
[58] Field of Search ........................ 528/362, 381, 388

[56] References Cited

U.S. PATENT DOCUMENTS 3,354,129 11/1967 Edmonds et al. ...................... 260/79
3,987,016 10/1976 Haddad et al. ..................... 260/79.1
4,440,915 4/1984 Asakura et al. ...................... 525/537

OTHER PUBLICATIONS

Chemical Abstracts, vol. 86, No. 4, 1/24/77, 17308e.
Patent Abstracts of Japan, vol. 11, No. 202 (C-432) (2649), 6/30/87.
Translation of claims 1–3, 62-27429 Japanese KOKAI, (2/1987).

Primary Examiner—Harold D. Anderson
Attorney, Agent, or Firm—Sughrue, Mion, Zinn, Macpeak & Seas

[57] ABSTRACT

A novel thermoplastic poly(arylene thioether) copolymer which may be cross-linked is provided. The copolymer may be prepared by reacting a dihalogenobenzonitrile, a dihalogenophenyl sulfone and a thioetherifying agent in a suitable organic solvent.

13 Claims, No Drawings

POLY(CYANO ARYLENE SULFIDE/SULFONE)COPOLYMER AND PREPARATION THEREOF

This invention relates to a poly(arylene thioether) copolymer and a process for preparation thereof. In particular, the invention relates to a poly(arylene thioether) copolymer which not only can be thermoplastically formed under suitable forming conditions including temperature condition but also can be thermoset, as well as to the production of such a copolymer.

As regards polymers capable of being cross-linked, various thermosetting resins such as epoxy and phenol resins are known. However, the conventional thermosetting resins generally have low molecular weights and consequently tend to exhibit relatively poor mechanical properties which means that the range of possible applications for them is often restricted. On the other hand, thermoplastic resins are relatively high in molecular weight, although there is generally a problem in that their thermal resistance properties are not always satisfactory when they are put into use.

Thus, there has been a great need for the development of new polymeric material exhibiting thermal resistance properties comparable or superior to those of the conventional thermosetting resins and displaying excellent mechanical properties at raised temperatures.

Examples of thermoplastic resins which have improved thermal resistance properties to a certain extent are disclosed, for example, in U.S. Pat. No. 3,987,016 and Japanese Patent Public Disclosure (Kokai) No. 62-27429. However, the thermal resistance properties of these known materials are still not enough and their solvent resistance properties and mechanical strength properties are not fully satisfactory either.

An object of the present ivention is to provide a novel polymeric material which can be formed by injection molding technique and which has high heat or thermal resistance properties, good solvent resistance properties and highly improved mechanical properties at raised temperaturs.

Another object of the invetion is to provide a process for preparing such a novel polymeric material.

A still another object of the invention is to provide articles formed or molded from such a novel polymeric material and postcured by cross-linking the material.

We have made great efforts to achieve these and other incidental objects and, as a result, have found that the objects may be favorably achieved by a copolymer comprising a given polymeric arylene thioether in which the backbone chain is constituted by repeating arylene units linked solely via sulfur atoms and in which the backbone chain carries cyano-group pendants at ortho-positions to the backbone-sulfur linkages, said pendants occuring from place to place along the backbone chain.

Accordingly, the present invention provides a novel poly(arylene thioether) copolymer consisting essentially of the following repeating units (I) and (II):

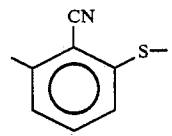  (I)

and

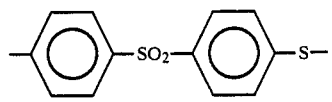  (II)

the numerals of the repeating units (I) and (II) in the polymer molecule being m and n, respectively, and the value of m/(m+n) ratio ranging from 0.01 to 0.99, said copolymer exhibiting a reduced viscosity $\eta_{sp}/C$ of not less than 0.2 dl/g as measured using a 0.5 g/dl solution of said copolymer dissolved in N-methyl pyrrolidone at 50° C.

The invention also provides a process for preparing poly(arylene thioether) copolymer which comprises reacting a dihalogenobenzonitrile of formula (III)

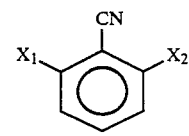  (III)

(wherein each $X_1$ and $X_2$, which may be the same or different, represent a halogen atom) and a dihalogenodiphenyl sulfone of formula (IV)

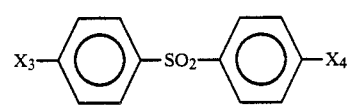  (IV)

(wherein each $X_3$ and $X_4$, which may be the same or different, represent a halogen atom) with a thioetherifying agent in an organic solvent.

In the present invention, it is essential that the backbone of the poly(arylene thioether) copolymer contains an aromatic ring unit onto which a cyano group is directly bonded. This pendant cyano group will effectively act in the cross-linking and curing of the copolymer. It is important for the purpose of the invention that the copolymer exhibits a reduced viscosity of not less than 0.2 dl/g as measured at 50° C. using a 0.5 g/dl solution of the copolymer dissolved in N-methyl pyrrolidone. Where the reduced viscosity is less than 0.2 dl/g, the polymer product will present certain disadvantages, such as an unacceptably low mechanical strength.

Examples of the dihalogenobenzonitriles which may be used in the invention include 2,6-dichlorobenzonitrile, 2,6-dibromobenzonitrile, 2,6-diiodobenzonitrile, 2-chloro-6-bromobenzonitrile and the like and mixtures thereof.

Examples of the dihalogenodiphenyl suflones which may be used in the invention include 4,4'-dichlorodiphenyl sulfone, 4,4'-dibromodiphenyl sulfone, 4,4'-difluorodiphenyl sulfone, 4-chloro-4'-bromodiphenyl sulfone and the like and mixtures thereof.

The thioetherifying agent may be, for example, an alkali metal sulfide and a combination of a sulfur source with an alkali metal hydroxide.

Examples of such an alkali metal sulfide include lithium, sodium, potassium, rubidium and cesium sulfides and mixtures therof. Examples of suitable sulfur sources include alkali metal hydrosulfides, thioamide hydrogensulfide, thiourea, thiocarbamate, thiocarboxylic acids, carbon disulfide, thiocarboxylates, sulfur itself, phosphorous pentasulfide and mixtures thereof. Particular examples of alkali metal hydrosulfides include lithium, sodium, potassium, rubidium and cesium hydrosulfides and mixtures thereof. Examples of alkali metal hydroxides include potassium, sodium, lithium and cesium hydroxides and mixtures thereof, with sodium hydroxide most preferred.

Generally, synthesis of the present poly(arylene thioether) copolymer comprising (I) and (II) repeating units from the dihalogenobenzonitrile (III), dihalogenodiphenyl sulfone (IV) and thioetherifying agent may be effected in an organic solvent at a raised temperature of about 50°–300° C., preferably about 150°–250° C., for a period of about 1–20 hours. The reaction is preferably carried out with stirring.

The molar ratio of the thioetherifying agent to the total of the dihalogenobenzonitrile and dihalogenodiphenyl sulfone used in the range of about 0.7 to about 1.30, in particular from 0.90 to 1.10, the most preferably substantially equimolar. Generally, the initial concentration of the monomeric starting materials (i.e. both the dihalogeno compounds plus the thioetherifying agent) in the reaction mixture before reaction is selected from the range of from about 100 to about 2000 g per liter of the solvent. Examples of the organic solvent which may be employed in the synthesis process of the poly(arylene thioether) copolymer include amide solvents such as N,N-dimethyl formamide, N,N-dimethyl acetamide, N-methyl-2-pyrrolidone and the like; and sulfur-containing solvents such as dimethyl sulfoxide, diphenyl sulfone, sulfonlane and the like.

The present novel poly(arylene thioether) copolymer is thermoplastic in nature and can be thermally shaped or molded like conventional thermoplastic resins. A notable character of the present copolymer material is that the copolymer can be advantageously cross-linked to give cured products. The cross-linking may be effected by heating the copolymer at a temperature of about 100°–400° C., preferably 200°–300° C. for a period of about 5 minutes to about 5 hours. A catalyst may be used for promoting the cross/linking reaction. Use of a catalyst will permit the reaction to be effected using a decreased temperature and/or a reduced process time. Examples of cross-linking catalysts which may be used include Lewis-acid salts, such as anhydrous aluminium chloride, anhydrous zinc chloride and anhydrous ferric chloride; phosphorous compounds, such as phosphorous pentachloride and phosphorous pentoxide; tertiary amines; amine oxides; and hydrocarbyl tin compounds, such as tetraphenyl tin.

EXAMPLES

The invention will be further illustrated with reference to the following non-limiting Examples.

EXAMPLE 1

Sodium sulfide ($Na_2S.2.8H_2O$; 90.34 g; 0.70 moles) and N-methyl-2-pyrrolidone (700 ml) were charged into a 2 l atuoclave and the temperature was raised with stirring. When raised to 170° C., the water in the reaction system began to distill itself out of the system. The temperature was further raised to 200° C. and heating at this temperature was continued until the distillation of water was fininshed. Thereafter, the temperature of the reactor was cooled down to 100° C. Into the cooled reactor, 2,6-dichlorobenzonitrile (36.86 g; 0.21 moles) and 4,4'-dichlorodiphenyl sulfone (140 g; 0.49 moles) were introduced and heated again to 200° C. with stirring and thereafter the reaction was permitted to proceed for 3 hours. At the end of this period the reaction mixture in the reactor was cooled to room temperature and poured into one liter of water. The mixture was then filtered and washed, in turn, with water and methanol. The product polymer was obtained in a yield of 149 g (99%).

This polymer exhibited a reduced viscosity ($\eta_{sp}/C$) of 0.43 dl/g as measured using a 0.5 g/dl solution of the polymer dissolved in N-methyl pyrrolidone at a temperature of 50° C.

Its infrared absorption spectrum (by the KBr tablet method) showed characteristic absorptions at 2200 $cm^{-1}$ (nitrile); 1310 and 1160 $cm^{-1}$ (sulfone); and 1070 $cm^{-1}$ (thioether). The relative intensities of the absorption peaks observed in the infrared spectrum were used to prepare a calibration curve, from which the relative composition of the product copolymer was determined. In this case, the calibration curve was prepared on the basis of the nitrile and thioether absorption peaks. From the curve, it was found that the copolymer had an n/(m+n) ratio of 0.29.

Thermal analysis of the copolymer showed that the copolymer had a glass transition temperature (Tg) of 205° C. and a thermal decomposition temperature (Td) of 478° C.

EXAMPLE 2

The procedure described in Example 1 was repeated except that the 2,6-dichlorobenzonitrile was used in an amount of 12.28 g (0.07 moles) and the 4,4'-dichlorodiphenyl sulfone was used in an amount of 181 g (0.63 moles).

Yield of the resultant polymer was 162 g (98%).

The polymer had a reduced viscosity ($\eta_{sp}/C$) of 0.36 dl/g.

The infrared spectrum of the polymer (by the KBr tablet method) showed characteristic absorptions at 2200 $cm^{-1}$ (nitrile); 1310 and 1160 $cm^{-1}$ (sulfone); and 1070 $cm^{-1}$ (thioether).

The value of m/(m+n) representing the relative composition of copolymer was determined to be 0.11.

Thermal analysis of the polymer showed a Tg of 208° C. and a Td of 473° C.

EXAMPLE 3

Sodium sulfide ($Na_2S.2.8H_2O$; 90.34 g; 0.70 moles), 2,6-dichlorobenzonitrile (36.86 g; 0.21 moles), 4,4'-dichlorodiphenyl sulfone (140 g; 0.49 moles) and N-methyl-2-pyrrolidone (700 ml) were charged into a 2 l autoclave and heated to 200° C. with stirring and allowed to react at this temperature for 3 hours. After the reaction, the reaction mixture was cooled to room temperature and poured into one liter of water. The aqueous mixture was filtered and the resulting filter cake was washed with water followed by methanol.

Yield of the product copolymer was 145 g (97%).

The polymer had a reduced viscosity ($\eta_{sp}/C$) of 0.62 dl/g.

The infrared spectrum of the polymer (by the KBr tablet method) showed characteristic absorptions at 2200 $cm^{-1}$ (nitrile); 1310 and 1160 $cm^{-1}$ (sulfone); and 1070 $cm^{-1}$ (thioether).

The value of m/(m+n) representing the relative composition of copolymer was determined to be 0.33.

Thermal analysis of the polymer showed a Tg of 209° C. and a Td of 476° C.

EXAMPLE 4

The procedure of Example 3 was repeated except that sodium hydrosulfide (33.6 g; 0.70 moles) and sodium hydroxide (28.0 g; 0.70 moles) were used in place of the sodium sulfide (Na₂S.8H₂O).

Yield of the product copolymer was 147 g (98%).

The polymer had a reduced viscosity ($\eta_{sp}/C$) of 0.33 dl/g.

The infrared spectrum of the polymer (by the KBr tablet method) showed characteristic absorptions at 2200 cm$^{-1}$ (nitrile); 1310 and 1160 cm$^{-1}$ (sulfone); and 1070 cm$^{-1}$ (thioether).

The value of m/(m+n) representing the relative composition of copolymer was determined to be 0.32.

Thermal analysis of the polymer showed a Tg of 203° C. and a Td of 482° C.

EXAMPLE 5

(Cross-linking)

This example illustrates cross-linking of the copolymer as prepared in Example 1.

A portion of the copolymer was dried at 120° C. and 1 mmHg for 5 hours in a vaccum drier. A sample weighing 10 mg was taken from the dried material. The sample was heated under a nitrogen stream from room temperature to 300° C. at a rate of 10° C./minute in a differential thermogravimeter and held at 300° C. for a further one hour.

No change in the weight of the polymer sample was observed either during the heating-up period or the holding period (1 hour at 300° C.).

Additional samples were subjected to cross-linking under the same conditions as those used in the above thermogravimetric test. Then the cross-linked samples were tested for solubility in various organic solvents. Although the copolymer before cross-linking was soluble in all of 1,1,2,2-tetrachloroethane, p-chlorophenol, dimethyl formamide, dimethyl acetamide, N-methyl pyrrolidone and dimethyl sulfoxide, the cross-linked polymer was found to be insoluble in the above-listed organic solvents.

Thermomechanical analysis (TMA) showed that the uncross-linked polymer had a softening point of 170° C. and the cross-linked polymer has an increased softening point of 193° C., indicating an improvement in the heat resistance property of the polymer achieved by cross-linking.

The novel poly(arylene thioether) copolymer according to the present invention exhibits excellent heat resistance properties, can be satisfactorily molded using, for example, injection and other molding techniques, by virtue of its thermoplastic property, and can be subjected to postcuring treatment by cross-linking after or during the molding or shaping stage. The postcured or cross-linked material is significantly improved in its solvent resistance and heat resistance properties. Thus, the present copolymer has an advantageous combination of thermoplastic and thermosetting properties.

What is claimed is:

1. A novel poly(arylene thioether) copolymer consisting essentially of the following repeating units (I) and (II):

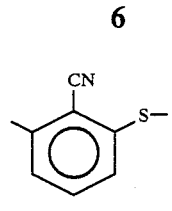

and

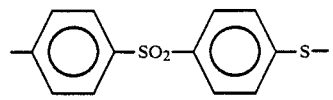

the numbers of the repeating units (I) and (II) in the polymer molecule being m and n, respectively, and the ratio of m/(m+n) ranging from 0.01 to 0.99, said copolymer exhibiting a reduced viscosity $\eta_{sp}/C$ of not less than 0.2 dl/g as measured using a 0.5 g/dl solution of said copolymer dissolved in N-methyl pyrrolidone at 50° C.

2. A copolymer according to claim 1 which respectively exhibits characteristic infrared adsorptions in the infrared absorption spectrum at about 2200 cm$^{-1}$ caused by the nitrile groups, at about 1310 and about 1160 cm$^{-1}$ caused by the sulphone groups and at about 1070 cm$^{-1}$ caused by the thioether groups, as determined using the KBr tablet method.

3. A process for preparing a poly(arylene thioether) copolymer which comprises reacting a dihalogenobenzonitrile of formula (III)

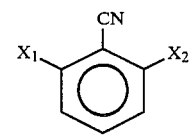

wherein each X₁ and X₂, which are the same or different, represent a halogen atom, and a dihalogenodiphenyl sulfone of formula (IV)

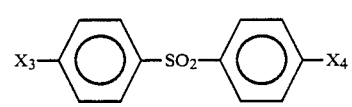

wherein each X₃ and X₄, which are the same or different, represent a halogen atom, with a thioetherifying agent in an organic solvent.

4. A process according to claim 3 wherein the dihalogenobenzonitrile is selected from 2,6-dichlorobenzonitrile, 2,6-dibromobenzonitrile, 2,6-diiodobenzonitrile, 2-chloro-6-bromobenzonitrile or mixtures thereof or the dihalogenodiphenyl sulfone is selected from 4,4'-dichlorodiphenyl sulfone, 4,4'-dibromodiphenyl sulfone, 4-chloro-4'-bromodiphenyl sulfone or mixtures thereof.

5. A process according to claim 3 or 4 wherein the thioetherifying agent comprises an alkali metal sulfide or a combination of a sulfur source with an alkali metal hydroxide.

6. A process according to claim 5 wherein the alkali metal sulfide is selected from lithium, sodium, potassium, rubidium or cesium sulfide or a mixture thereof.

7. A process according to claim 5 wherein the sulfur source is selectd from an alkali metal hydrosulfide, hydrogen sulfide, a thioamide, thiourea, thiocarbamate, a thiocarboxylic acid, carbon disulfide, a thiocarboxylate, sulfur, phosphorous pentasulfide or a mixture thereof and the alkali metal hydroxide is selected from potassium sodium, lithium or cesium hydroxide or a mixture thereof.

8. A process according to claim 7 wherein the alkali metal hydrosulfide is selected from lithium, sodium, potassium, rubidium or cesium hydrosulfide or a mixture thereof.

9. A process according to claim 3 wherein the reaction is effected at a temperature of about 50°–300° C. for a period of about 1 to 20 hours under agitation.

10. A process according to claim 9 wherein the temperature is in the range of about 150°–250° C.

11. A process according to claim 3 wherein the molar ratio of the thioetherifying agent to the total of the dihalogenobenzonitrile and dihalogenodiphenyl sulfone employed is substantially equimolar in the range of about 0.7 to about 1.30.

12. A process according to claim 3 wherein the initial concentration of the sum of the monomeric dihalogeno compounds plus the thioetherifying agent is in the range of about 100 to about 2000 g per liter of the solvent.

13. A process according to claim 3 wherein the organic solvent is selected from N,N-dimethyl formamide, N,N-dimethyl acetamide, N-methyl-2-pyrrolidone, dimethyl sulfoxide, diphenyl sulfone or sulfolane or any appropriate mixture thereof.

* * * * *